(12) United States Patent
Hyser

(10) Patent No.: US 7,200,734 B2
(45) Date of Patent: Apr. 3, 2007

(54) OPERATING-SYSTEM-TRANSPARENT DISTRIBUTED MEMORY

(75) Inventor: Chris Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 10/909,786

(22) Filed: Jul. 31, 2004

(65) Prior Publication Data

US 2006/0041733 A1   Feb. 23, 2006

(51) Int. Cl.
*G06F 12/00* (2006.01)
(52) U.S. Cl. ........................ 711/203; 711/206
(58) Field of Classification Search ................ 711/203, 711/206
See application file for complete search history.

(56) References Cited

U.S. PATENT DOCUMENTS 5,937,431 A * 8/1999 Kong et al. .................. 711/145
2004/0154011 A1* 8/2004 Wang et al. ................. 717/158

* cited by examiner

*Primary Examiner*—Reba I. Elmore
(74) *Attorney, Agent, or Firm*—Richard P. Lange

(57) ABSTRACT

Various embodiments of the present invention provide distributed computing systems featuring an operating-system-transparent distributed memory that, among other things, facilitates shared-message-based inter-thread communication between intercommunicating threads executing concurrently on a single-processor computer system, concurrently and simultaneously on a multi-processor computer system, and concurrently and simultaneously on multiple, discrete computer systems. Certain embodiments of the present invention are implemented using a secure-platform architecture in which secure-platform code running on processors within a distributed computing system provide a virtual, or logical, computing platform on which operating systems and higher-level software can be layered. A distributed memory system is provided by the secure-platform layer, using an extension of the memory-management hardware, firmware, and software systems originally developed to support virtual memory in single-processor and multi-processor computer systems. In essence, logical processors, logical caches, logical memory, and logical mass-storage-device-implemented backing store are mapped onto the individual processors, caches, memories, and interconnected mass-storage systems of a number of discrete computer systems interconnected by high-speed networking.

11 Claims, 17 Drawing Sheets

OPERATING-SYSTEM-TRANSPARENT DISTRIBUTED MEMORY

TECHNICAL FIELD

The present invention relates to computer architecture, operating systems, distributed computing, and, in particular, to a distributed computing system providing a logical, distributed memory that facilitates inter-thread communication.

BACKGROUND OF THE INVENTION

As the need for increasing computer processing power, storage capacity, and communications bandwidth continues to outpace phenomenal increases in the speeds and capacities of processors, memories, communications systems, and mass-storage devices, various approaches for distributed computing have evolved to harness discrete computer systems into high-end, distributed computer systems. Single-processor computer systems were originally interconnected by network communications systems so that processes running independently on the computer systems could intercommunicate and coordinate activities and share data. High-end computers have evolved from single-processor machines to multi-processor computers and, later, to diverse, extremely parallel, distributed systems comprising tens, hundreds, and even thousands of individual computer systems interconnected by network communications systems, in which processes may migrate from one computer to another based on the availability of processing cycles on the different computer systems within the distributed computer system. Programming techniques have also evolved, providing, in addition to single-threaded processes assigned to particular processors, distributed processes supporting partially independent execution of tens, hundreds, and thousands of execution threads within the context of each process that execute on multiple processors.

Although computational techniques have evolved greatly in order to support highly distributed computing systems, in which processes and threads can be transferred from machine to machine during execution, the mechanisms by which threads communicate with one another have remained largely unchanged. These methods include shared-memory-based communication and message-based communication. Shared-memory-based communication involves providing memory regions that can be concurrently accessed by numerous threads, so that values deposited by one thread may be accessed by another. Message-based thread communications involves sending data-containing messages from one thread to another. Message-based thread communications may be implemented using shared memory, or may be implemented using high-speed networking, operating-system support, and other techniques that allow a thread to compose and transmit a data-containing message to another, concurrently executing thread. In distributed computing systems, a great deal of data is exchanged by messages, because processes and threads are generally distributed on independent machines interconnected through high-speed networking systems. For this reason, message-based inter-thread communication has been traditionally used for distributed computing systems. Shared-memory-based thread communications has been traditionally used on discrete, single-processor and multi-processor computing systems, in which processors physically share access to a common, physical memory. Shared-memory-based inter-thread communication is the simplest type of inter-thread communication to implement and employ. Designers, implementers, and users of distributed computing systems have long desired a distributed computing system in which shared-memory-based inter-thread communication can be employed for threads executing both within a single machine as well as for threads distributed over multiple machines interconnected by high-speed networked communications systems.

SUMMARY OF THE INVENTION

Various embodiments of the present invention provide distributed computing systems featuring an operating-system-transparent distributed memory that, among other things, facilitates shared-message-based inter-thread communication between intercommunicating threads executing concurrently on a single-processor computer system, concurrently and simultaneously on a multi-processor computer system, and concurrently and simultaneously on multiple, discrete computer systems. Certain embodiments of the present invention are implemented using a secure-platform architecture in which secure-platform code running on processors within a distributed computing system provide a virtual, or logical, computing platform on which operating systems and higher-level software can be layered. A distributed memory system is provided by the secure-platform layer, using an extension of the memory-management hardware, firmware, and software systems originally developed to support virtual memory in single-processor and multi-processor computer systems. In essence, logical processors, logical caches, logical memory, and logical mass-storage-device-implemented backing store are mapped onto the individual processors, caches, memories, and interconnected mass-storage systems of a number of discrete computer systems interconnected by high-speed networking.

DETAILED DESCRIPTION OF THE INVENTION

Embodiments of the present invention are directed to an operating-system-transparent distributed memory that, among other things, facilitates inter-thread communication in multi-threaded processes running in distributed computing platforms. Distributed-memory-based inter-thread communication using the operating-system-transparent distributed memory is relatively simple, from a programming standpoint, computationally efficient, and time efficient.

Figure 1:
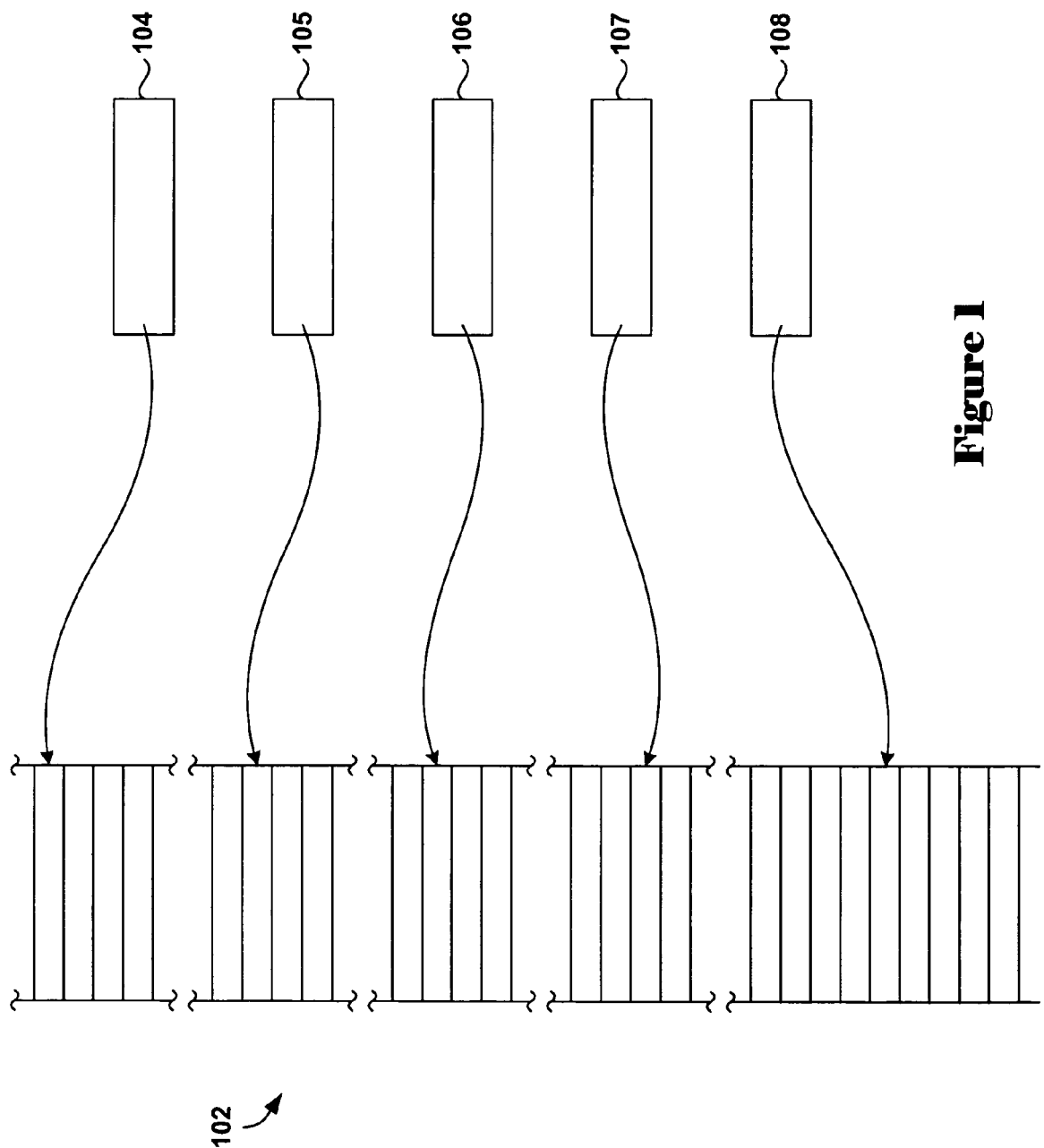
FIG. 1 illustrates multi-threaded computing.

FIG. 1 illustrates multi-threaded computing. In its very basic level, an executing entity, whether a process or thread, is abstractly represented as a series of instructions within an electronic memory 102 and the contents of a memory register 104 that reference a next instruction in memory 102 to be executed. The memory register containing a pointer to the next instruction for execution is often referred to as the "instruction-pointer" register, or "IP." Multi-threaded computing involves a number of logical IP registers 104–108 containing pointers to the next instructions for execution by a number of logical executing entities, or threads, that concurrently, on a single-processor machine, or concurrently and simultaneously, on a multi-processor machine or distributed computer system, execute a program stored as a series of computer instructions in memory 102.

Figure 2A:
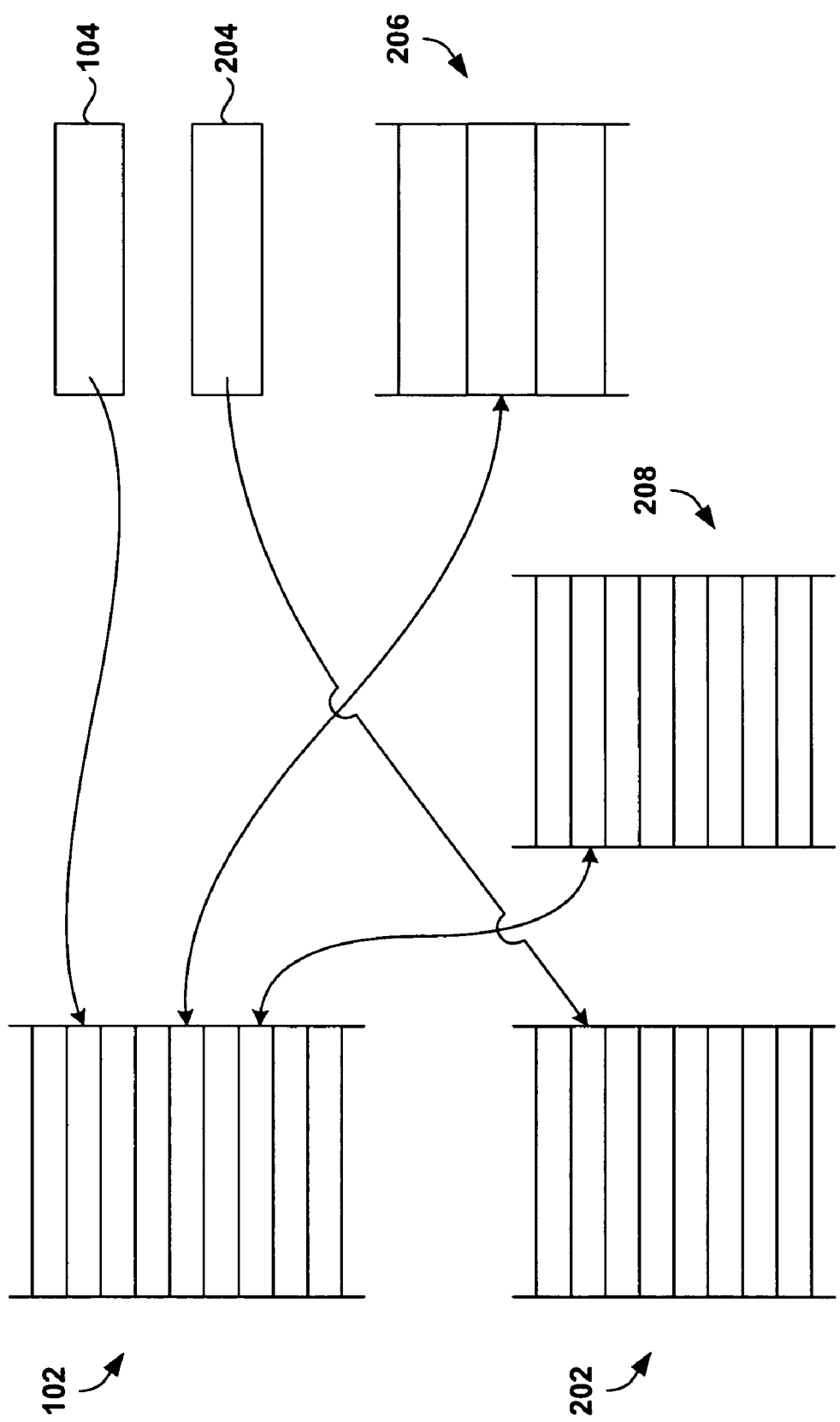
FIGS. 2A–B illustrates processes and threads.
Figure 2B:
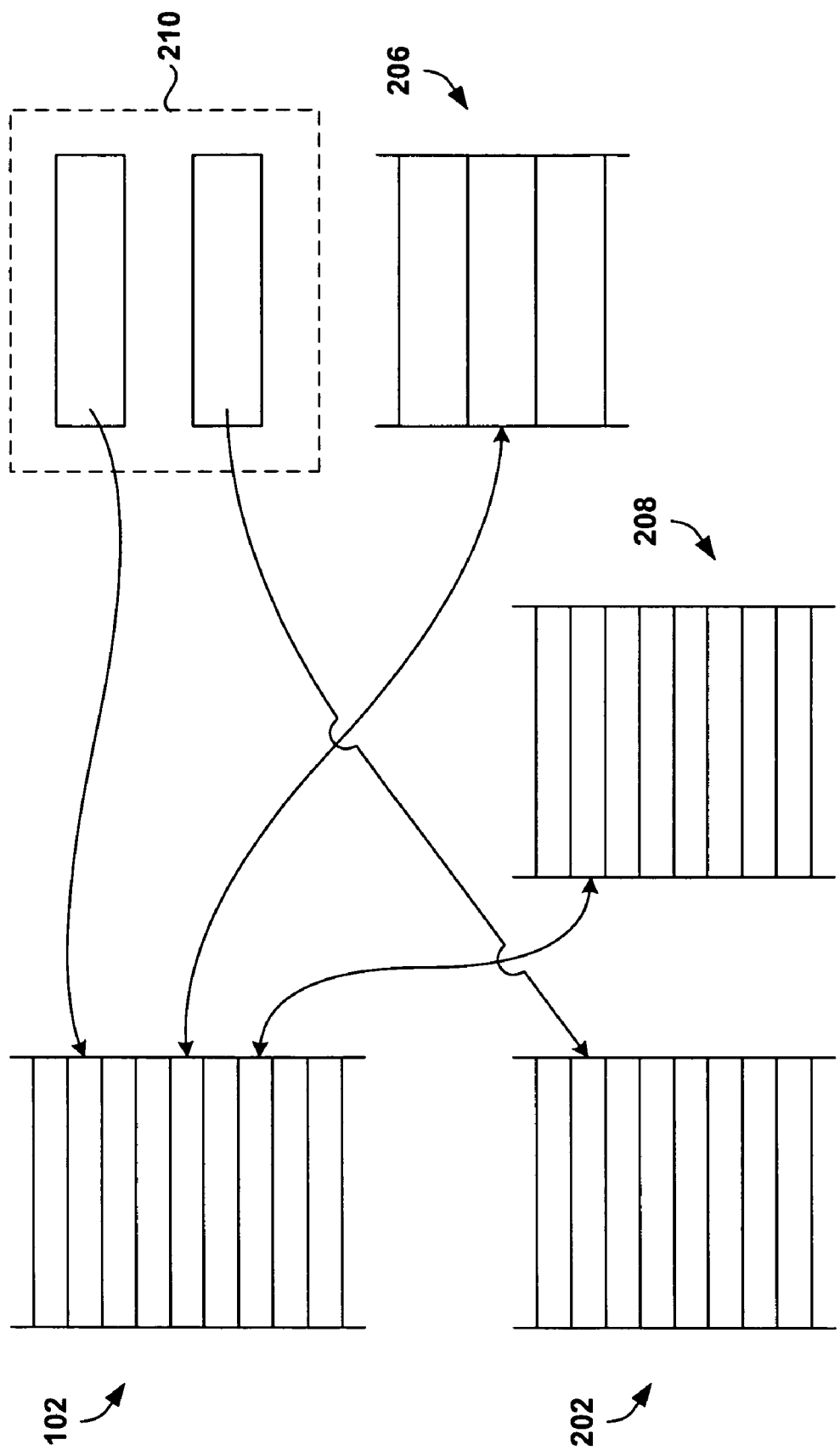

FIGS. 2A–B illustrate processes and threads. In FIG. 2A, various basic components of an executing process are shown. In modern computing systems, a process represents execution of a program as defined by the operating-system environment residing on a computer system. The operating system employs hardware and firmware resources of a physical computer system to define and control a number of concurrently, or concurrently and simultaneously executing, processes. For example, when a user invokes an application program on a personal computer ("PC"), the operating system resident on the PC launches a process that executes a stored program corresponding to the application. In general, a process is computationally defined by a set of instructions stored in memory 102 that together compose a stored program, the contents of an IP register 104, the contents of a memory region 202 allocated for storage and retrieval of temporary data, and referenced by the contents of a stack-pointer register ("SP") 204, the contents of other machine registers 206, and the contents of an additional area of memory 208 allocated to the process for data storage and retrieval. An operating system on a single-processor machine can time-multiplex a number of concurrently executing processes by allowing each process a series of fixed intervals of processing time, called "time slices," and intervening time slices for different, concurrently executing processes. The operating system stores the contents of the IP, SP, and other machine registers 104, 204, and 206, respectively, for a process at the end of a time slice and restores, for the process, the contents of the IP, SP, and other machine registers at the beginning of a next time slice. On a multi-processor machine, each processor has a separate IP, SP, and other machine registers, allowing for a number of processes equal to the number of processors to simultaneously execute within the multi-processor computer system. In a distributed computer system, a number of processes equal to the number of processors within a number of discrete computer systems can simultaneously execute, with each processor time sliced by a distributed operating system to provide for concurrent execution of hundreds, thousands, or tens of thousands of separate processes.

Initially, operating systems provided an environment in which a process represents the finest granularity of sequential execution. However, over time, multi-threaded processes were developed and supported by various operating systems. A multi-threaded process supports concurrent or concurrent and simultaneous execution of multiple threads within the overall context of a single process. Many different kinds of threads are currently supported, depending on the extent of the thread-specific state maintained by the operating system for each independently executing thread. As shown in FIG. 2B, the most lightweight, and simplest, thread definition involves maintaining, by an operating system, a separate, logical IP and SP 210 for each independent thread. The lightweight threads otherwise share a common program memory 102, stack memory 202, data memory 208, and other machine registers 206. Careful programming and intricate coordination strategies are often necessary to coordinate independent execution of lightweight threads. A wide range of thread types can be supported by maintaining additional state information for each thread. For example, heavier-weight threads may each be associated not only with separate, logical IP and SP registers, but also separate, additional logical machine registers 206, stack space 202, and at least portions of the data-storage space 208.

Figure 3:
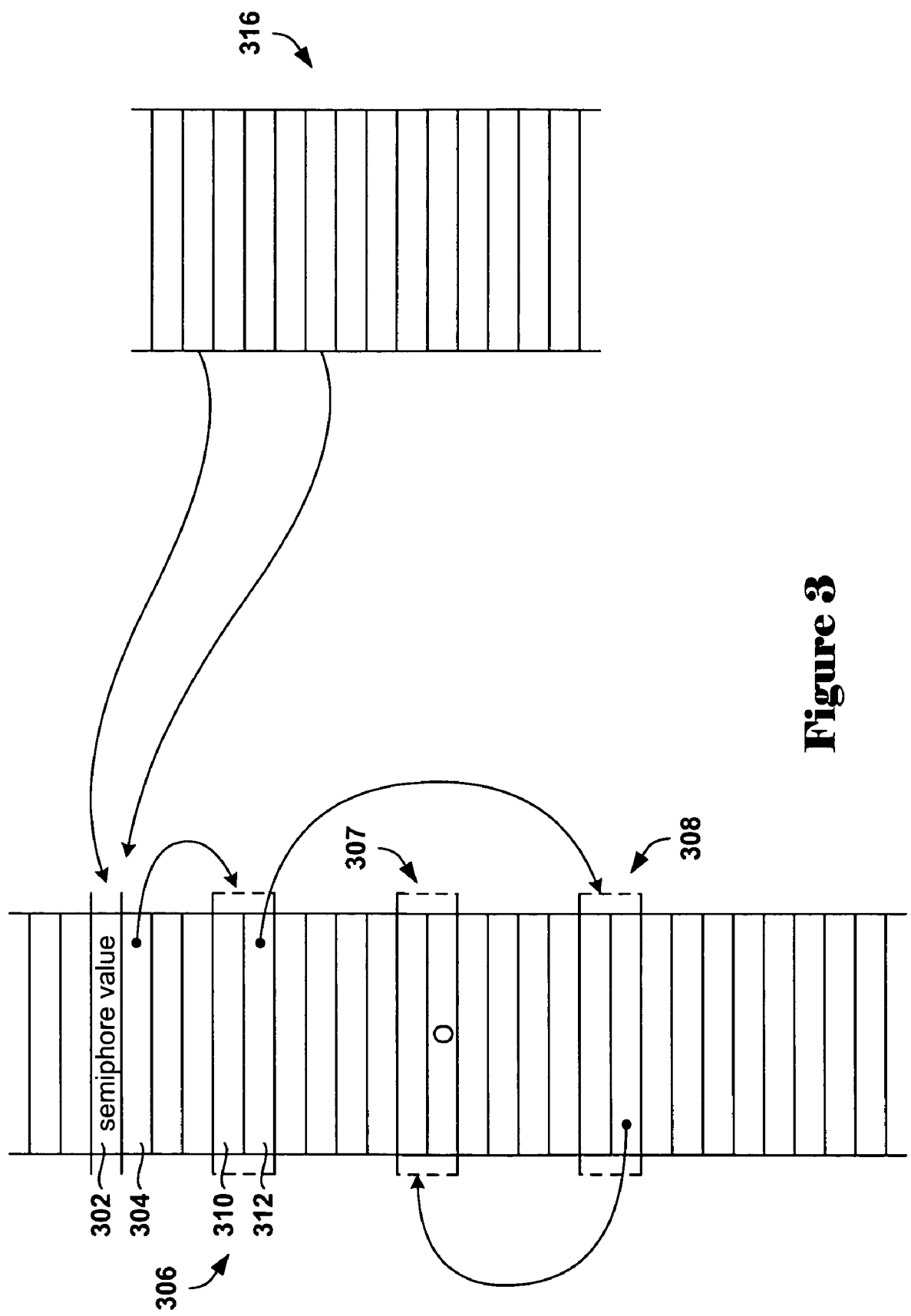
FIG. 3 illustrates an example of shared-memory-based inter-thread communication and coordination.

When threads concurrently and/or simultaneously execute within a single machine, and when the threads all share access to at least a portion of the data memory allocated for their containing process, as is almost always the case, the threads can intercommunicate with one another, and can synchronize execution among themselves, using values stored in the common memory. FIG. 3 illustrates an example of shared-memory-based inter-thread communication and coordination. In FIG. 3, a semaphore and an associated linked-list data structure, is stored within the shared memory accessible by all threads of a process. The semaphore consists of a semaphore value 302 stored in shared memory, which, by a programming convention, controls access to the linked-list data structure. The linked list includes a head pointer 304 and, in the case shown in FIG. 3, three linked data elements 306–308, each of which includes a data value, such as data value 310, and a pointer 312 to the next data element in the linked list. Code within the program 316 concurrently or simultaneously executed by multiple threads includes semaphore primitives and linked-list storage and retrieval routines. One semaphore primitive employs a spin lock and critical sections to ensure that only one thread, at any given point in time, can access the linked list controlled by the semaphore. Access to the linked list is therefore single-threaded by the semaphore value 302 and associated semaphore primitives within the program 316. In certain cases, semaphore primitives reside in operating-system code, accessible to processes and threads via operating-system routine calls. The semaphore-controlled linked list may be used for storage and retrieval of data, or messages, directed from one thread to another, and may be also used to coordinate thread activity. For example, the semaphore-controlled link list may be a logical queue of threads waiting to execute or to access some particular piece of code, stored value, data structure or other resource. Currently, shared-memory-based inter-thread communication and control implies that all threads can access a common shared memory. This is generally possible only within a single computer system. Certain distributed computing systems currently attempt to support global shared memory via complex, networking-based systems, but are generally difficult to implement, computationally inefficient, and require extensive operating-system support and modification.

Figure 4:
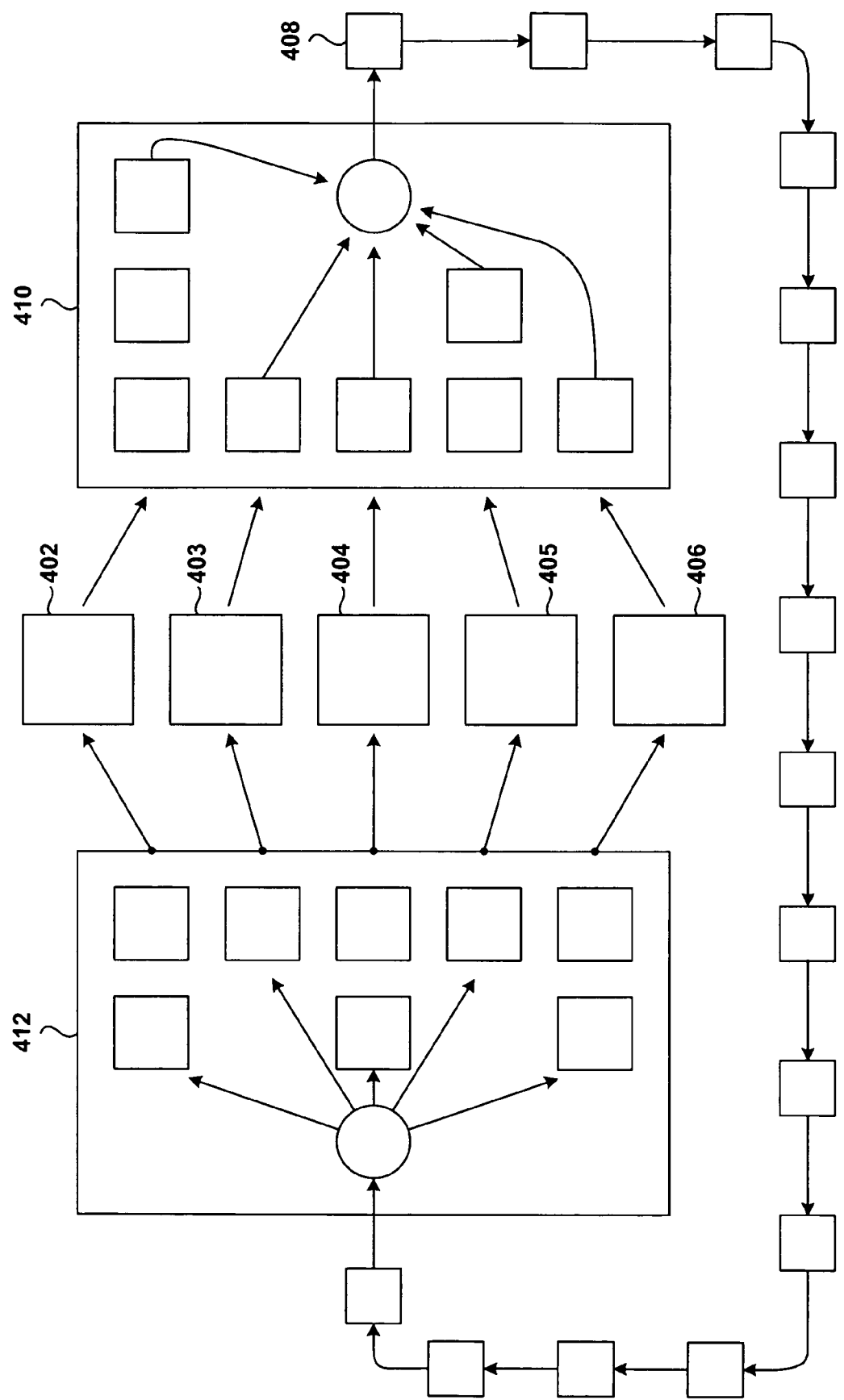
FIG. 4 illustrates a second, common approach to inter-thread communication and coordination.

FIG. 4 illustrates a second, common approach to inter-thread communication and coordination. In FIG. 4, a number of threads are represented by a central column of square objects 402–406. In order to communicate with one another, and to potentially cooperatively control operation amongst themselves, each thread can transmit messages to, and receive messages from, other threads. In FIG. 4, the messages are represented by small squares, such as small square 408. In order to implement message passing, a message-receiving entity 410 is needed to receive message transmitted from each thread, store the messages, and transmit the received message to a message-distributing entity 412 which distributes messages addressed to particular threads. Message-based inter-thread communication is similar to, and generally relies upon, familiar message-based networking and communications systems. For message-based intercommunication, threads generally need to be associated with unique identifiers, and extensive operating-system support, or ad-hoc messaging system support within processes, needs to be provided for implementing the message-receiving and message-distributing entities 410 and 412. Often, many layers of message-receiving and message-distributing entities are implemented, layer-upon-layer, within computer systems. Comparison of FIGS. 3 and 4 reveal that shared-memory-based inter-thread communication and cooperative control is far simpler to implement and use than message-based systems. Shared-memory-based inter-thread communication merely involves coordinated storage and retrieval of data values from shared memory, while message-based systems involve rather elaborate, separate implementation of message-handling systems, and message transmitting and message receiving primitives.

Figure 5:
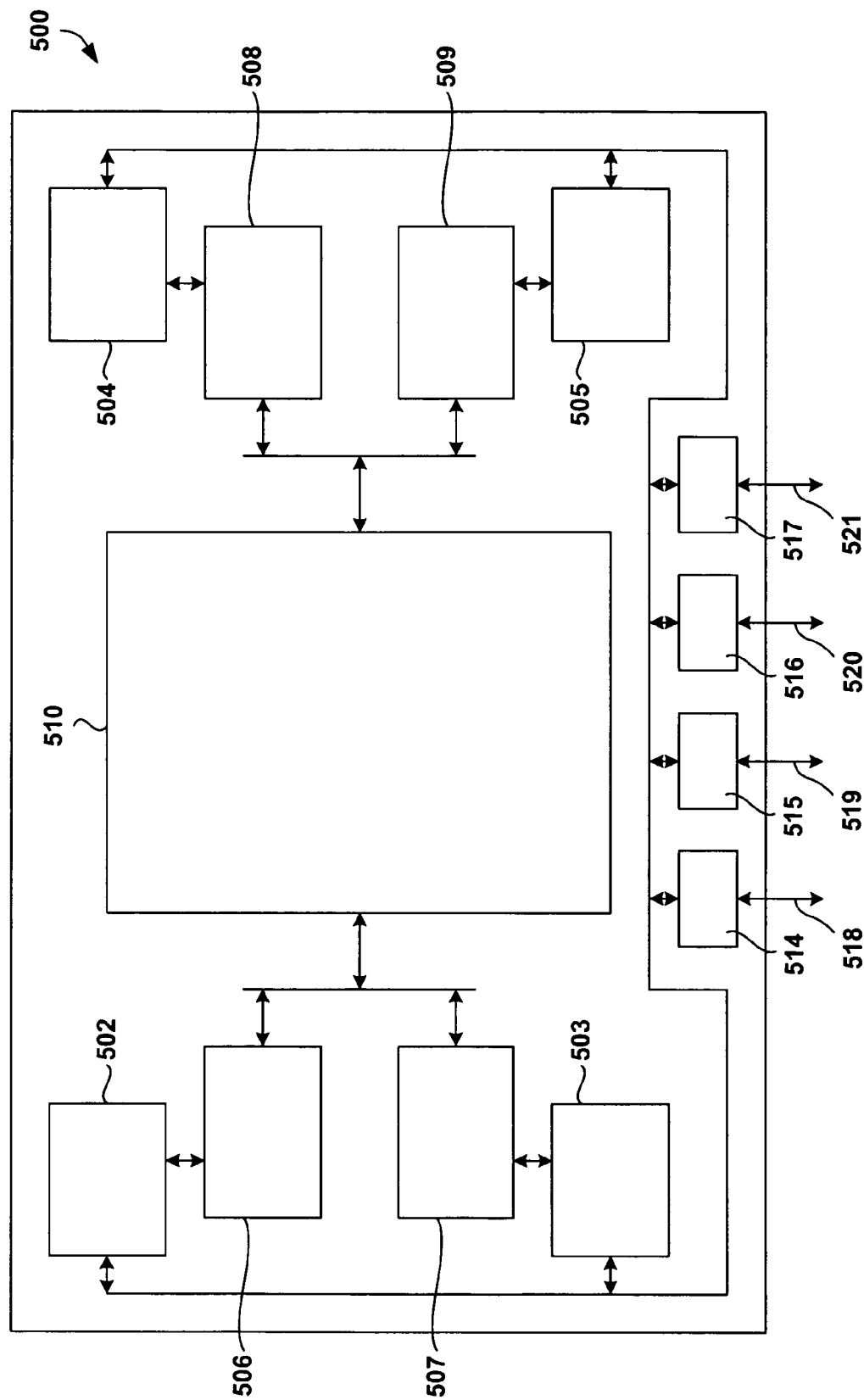
FIG. 5 shows an abstract representation of a multi-processor computer system.

FIG. 5 shows an abstract representation of a multi-processor computer system. In the multi-processor computer system, each processor 502–505 is associated with a local cache memory 506–509, respectively. The cache memories, in turn, are interconnected with busses to a large, shared, physical memory 510. The multi-processor computer system 500 can also access, through busses 512, I/O controllers 514–517, and communications links 518–521, external mass-storage devices that serve as backing store for main memory 510 and the local caches 506–509. Such multi-processor systems generally implement virtual memory, in which processes running on the processors enjoy access to a large memory address space supported by the contents of the local cache associated with the processor on which the process is running, main memory, and data stored on mass-storage devices, using a virtual-memory system described, in greater detail, below. Normally, only a small portion of the entire address space is needed within reasonably long periods of computing time by any given process. As execution progresses, the process may slowly access a different group of memory addresses, and data corresponding to the different group of addresses can be paged in from mass-storage devices into main memory, and can migrate to local caches upon demand by the executing processors. In a multi-processor system, such as that shown in FIG. 5, it is natural to employ shared-memory-based inter-thread communication, because the operating system can arrange to provide shared assess by all threads of a process to a portion of the virtual-memory address space for that process, and can implement the shared virtual-memory by a combination of hardware, firmware, and operating-system support, including coordination of data migration from main memory 510 to and from local caches. Therefore, a thread executing on any of the processors 502–505 can access, via the local cache and virtual-memory system, a shared virtual-memory address space accessible to threads executing on all the other processors.

Figure 6:
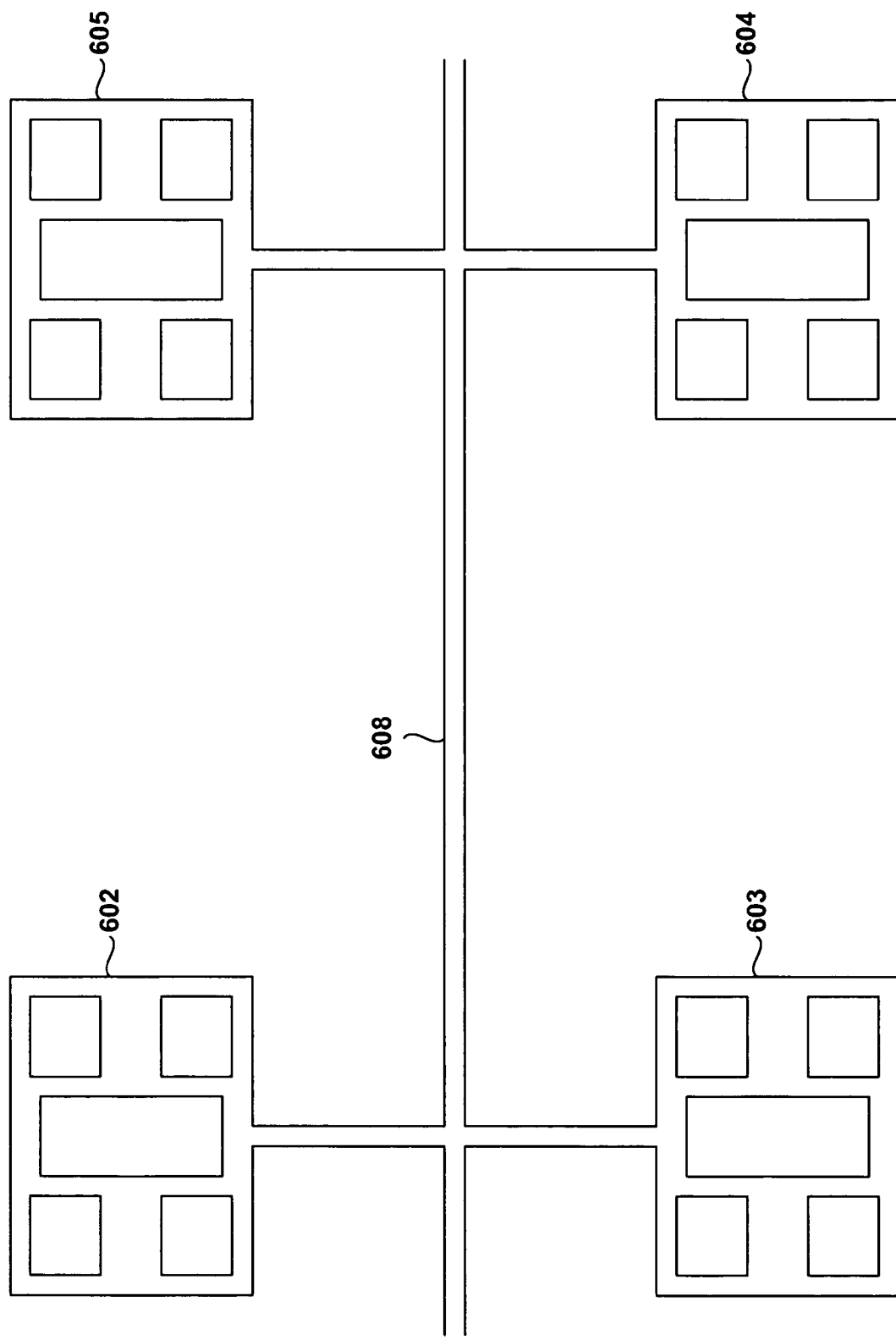
FIG. 6 schematically illustrates a distributed computing system.

FIG. 6 schematically illustrates a distributed computing system. In FIG. 6, four multi-processor computer systems 602–605, similar to the multi-processor computer system show in FIG. 5, are interconnected by high-speed networking 608 via a fibre channel, high-bandwidth Ethernet, or other network communication system. In a distributed computing environment, the threads of a process may concurrently and simultaneously execute on processors of any of a subset of, or the entire number of, interconnected computer systems. For example, the threads of a process may be distributed over processors in computer systems 602, 603, and 604 in FIG. 6. Because the basic primitive for communications between the discrete computer systems in a distributed computer system, such as that shown in FIG. 6, is a message-based communications system, message-based inter-thread communications and cooperative control are normally employed for distributed computer systems. Attempts have been made to implement global shared memory on top of message-based network communications, but many such attempts have proven to be computationally inefficient and difficult to administer, and rely on extensive operating-system support provided by specialized, distributed-computing operating systems.

Figure 7:
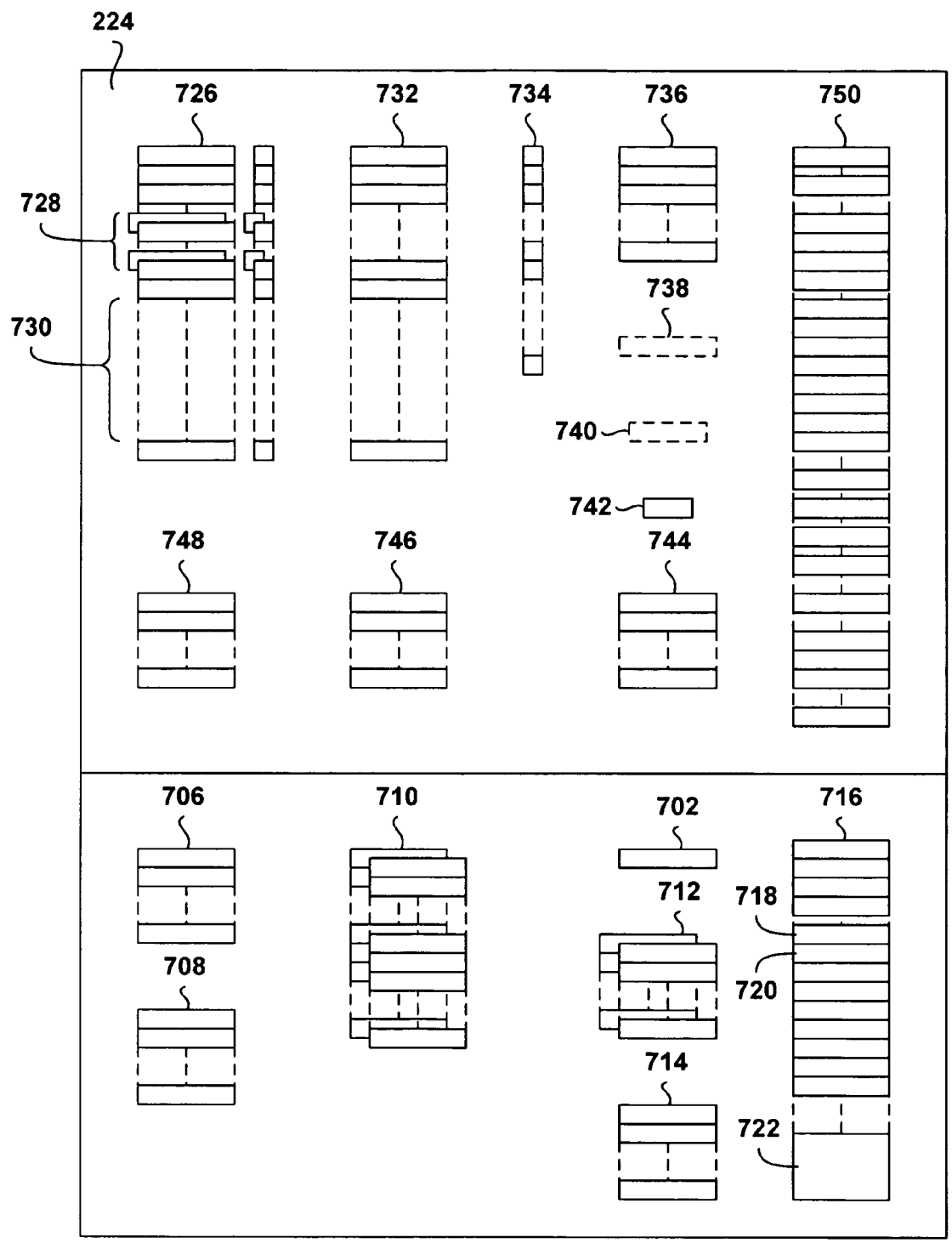
FIG. 7 is a block diagram showing the registers within one type of modern processor.
Figure 8:
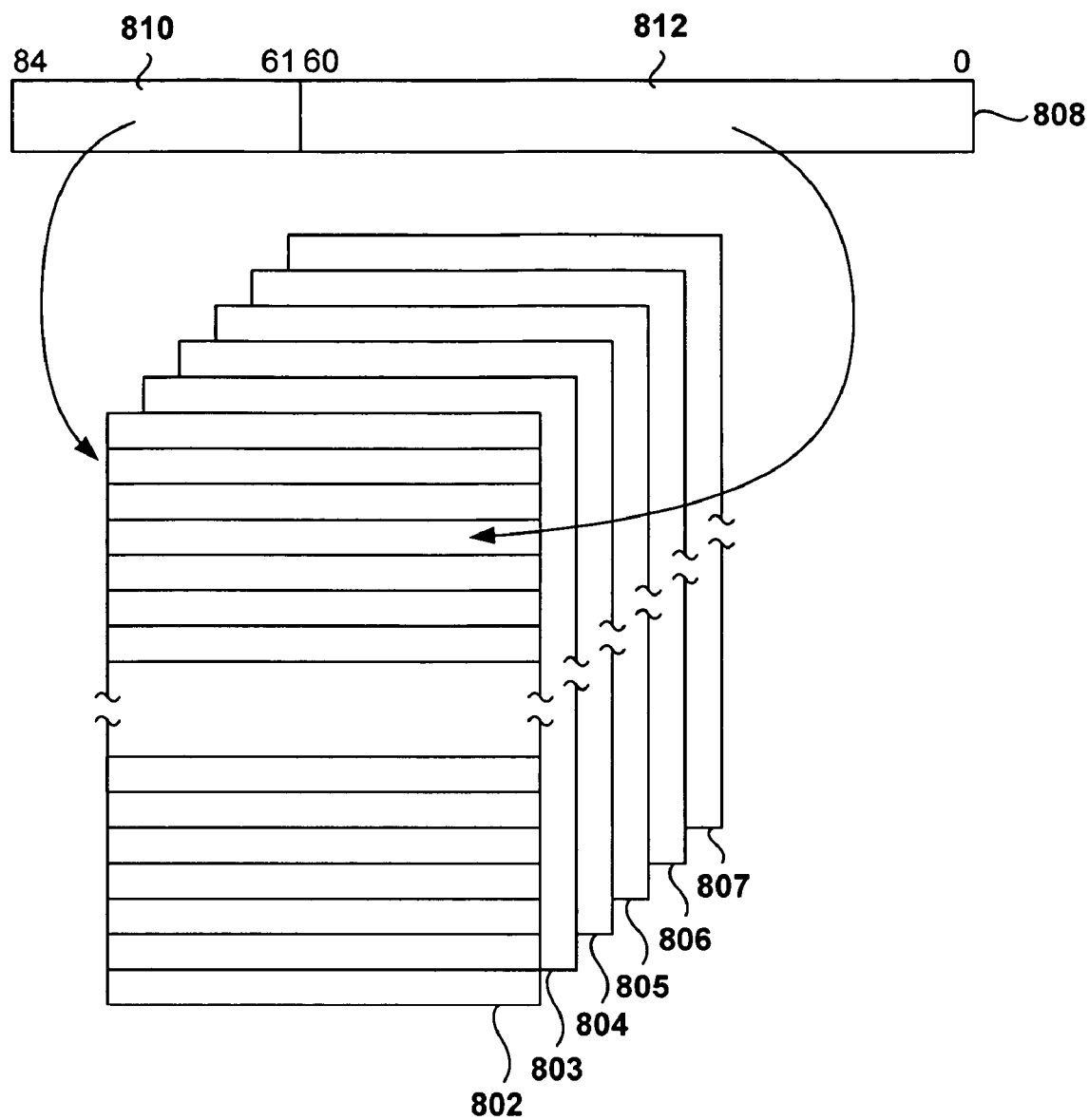
FIG. 8 illustrates the virtual address space provided by one modern computer architecture.

A recently developed computational platform for secure computing, referred to as a secure platform, can be used, in certain embodiments of the present invention, to provide distributed shared memory to facilitate shared-memory-based inter-thread communication between threads of distributed processes. Processors built to comply with the Intel® IA-64 computer architecture represent the fundamental hardware interface of a series of modern computer hardware platforms suitable for combination with a secure platform software layer to produce a combined-hardware-and-software secure-platform interface. FIG. 7 is a block diagram showing the registers within one modern processor. The registers hold values that define the execution state of the processor, and, when saved to memory, capture the state of an executing process prior to stopping execution of the process. Restoring certain registers saved in memory allows for resumption of execution of an interrupted process. The register set shown in FIG. 7 is quite complex, and only certain of the registers are described, below.

One control register is the process status register ("PSR") 702. The PSR is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The highest privilege level is privilege level 0. The lowest privilege level is privilege level 3. Only processes executing at privilege level 0 are allowed to access and manipulate certain machine resources, including the subset of registers, known as the "system-register set," shown in FIG. 7 within the lower rectangle 704. These system registers include a set of region registers 706, a set of protection-key registers 708, data and instruction translation look aside buffer registers 710, a set of debug-breakpoint registers 712, a set of performance-monitor-configuration registers 714, and a set of control registers 716. One control register, the interruption status register ("IPSR") 718, stores the value of the PSR for the most recently interrupted process. The interruption status register ("ISR") 720 contains a number of fields that indicate the nature of the interruption that most recently occurred. Other control registers store information related to other events, such as virtual memory address translation information related to a virtual address translation fault, pointers to the last successfully executed instruction bundle, and other such information. Sets of external control interrupt registers 722 are used, in part, to set interrupt vectors.

The registers shown in FIG. 7 in the upper rectangular region 724 are known as the "application-register set." These registers include a set of general registers 726, sixteen of which 728 are banked in order to provide immediate registers for interruption handling code. At least 96 general registers 730 form a general-register stack, portions of which may be automatically stored and retrieved from backing memory to facilitate linkages among calling and called software routines. The application-register set also includes floating point registers 732, predicate registers 734, branch registers 736, an instruction pointer 738, a current frame marker 740, a user mask 742, performance monitor data registers 744, processor identifiers 746, an advanced load address table 748, and a set of specific application registers 750.

The IA-64 architecture provides a 2-bit privilege-level field in the processor status register, in turn providing for 4 privilege levels: PL0—the most privileged, kernel privilege level; PL1—the next most privileged privilege level; PL2—the next most privileged level; and PL3—the application-level privilege level.

The memory and virtual-address-translation architecture of the IA-64 computer architecture is described below, with references to FIGS. 8–11. The virtual address space defined within the Intel IA-64 computer architecture includes $2^{24}$ regions, such as regions 802–807 shown in FIG. 8, each containing $2^{61}$ bytes that are contiguously addressed by successive virtual memory addresses. Thus, the virtual memory address space can be considered to span a total address space of $2^{85}$ bytes of memory. An 85-byte virtual memory address 808 can then be considered to comprise a 24-bit region field 810 and a 61-bit address field 812.

Figure 9:
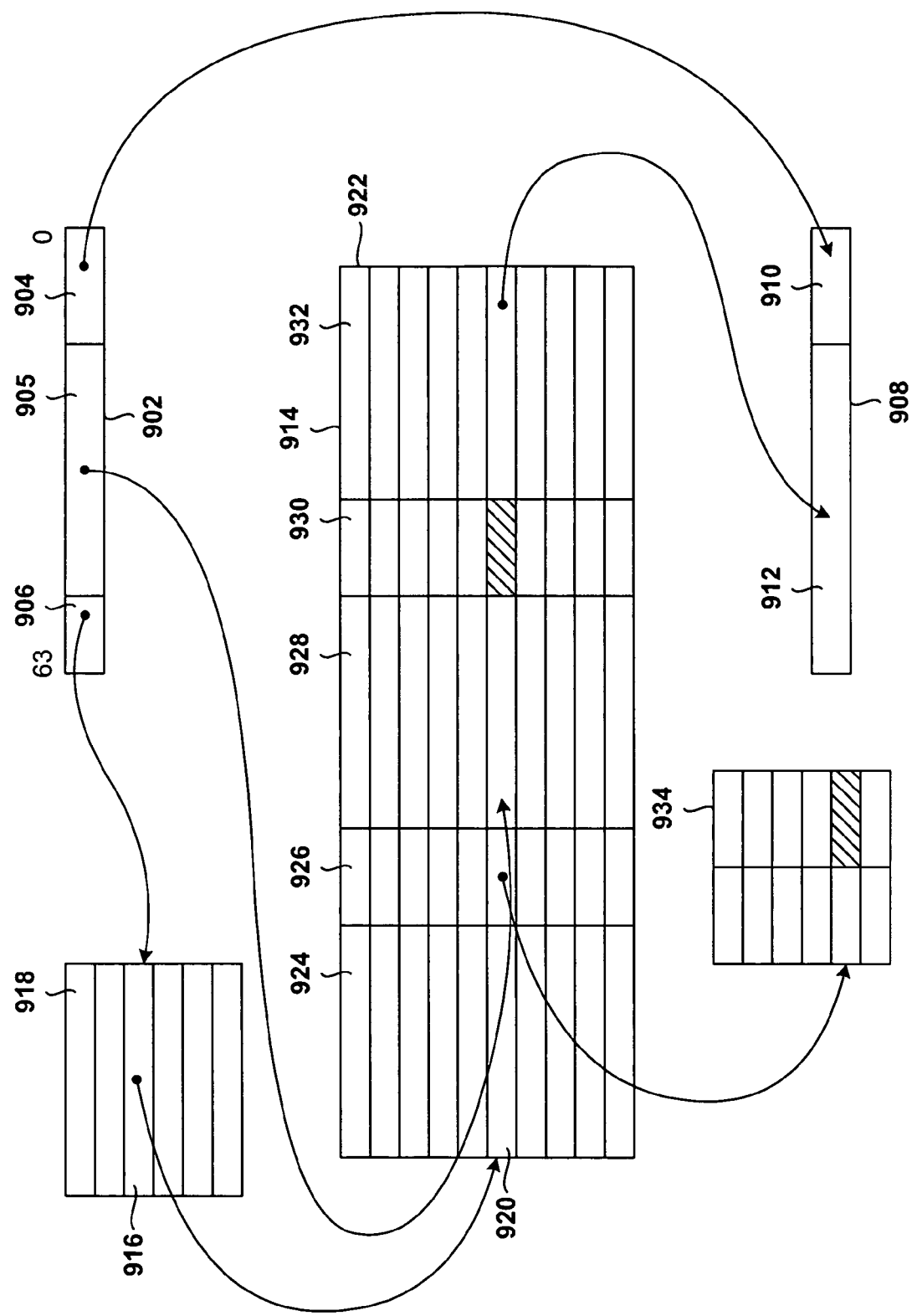
FIG. 9 illustrates translation of a virtual memory address into a physical memory address via information stored within region registers, protection key registers, and a translation look-aside buffer.

In general, however, virtual memory addresses are encoded as 64-bit quantities. FIG. 9 illustrates translation of a 64-bit virtual memory address into a physical memory address via information stored within region registers, protection key registers, and a translation look-aside buffer ("TLB"). In the Intel®IA-64 architecture, virtual addresses are 64-bit computer words, represented in FIG. 9 by a 64-bit quantity 902 divided into three fields 904–906. The first two fields 904 and 905 have sizes that depend on the size of a memory page, which can be adjusted within a range of memory page sizes. The first field 904 is referred to as the "offset." The offset is an integer designating a byte within a memory page. If, for example, a memory page contains 4096 bytes, then the offset needs to contain 12 bits to represent the values 0–4095 in the binary number system. The second field 905 contains a virtual page address. The virtual page address designates a memory page within a virtual address space that is mapped to physical memory, and further backed up by memory pages stored on mass storage devices, such as disks. The third field 906 is a three-bit field that designates a region register containing the identifier of a region of virtual memory in which the virtual memory page specified by the virtual page address 905 is contained.

Translation of the virtual memory address 902 to a physical memory address 908 that includes the same offset 910 as the offset 904 in the virtual memory address, as well as a physical page number 912 that references a page in the physical memory components of the computer system, is carried out by the processor, at times in combination with kernel and operating system routines. If a translation from a virtual memory address to a physical memory address is contained within the TLB 914, then the virtual-memory-address-to-physical-memory-address translation can be entirely carried out by the processor without operating system intervention. The processor employs the region register selector field 906 to select a register 916 within a set of region registers 918. The selected region register 916 contains a 24-bit region identifier. The processor uses the region identifier contained in the selected region register and the virtual page address 905 together in a hardware function to select a TLB entry 920 containing a region identifier and virtual memory address that match the region identifier contained in the selected region register 916 and the virtual page address 905. Each TLB entry, such as TLB entry 922, contains fields that include a region identifier 924, a protection key associated with the memory page described by the TLB entry 926, a virtual page address 928, privilege and access mode fields that together compose an access rights field 930, and a physical memory page address 932.

If an entry in the TLB can be found that contains the region identifier contained within the region register specified by the region register selector field of the virtual memory address, and that contains the virtual page address specified within the virtual memory address, then the processor determines whether the virtual memory page described by the virtual memory address can be accessed by the currently executing process. The currently executing process may access the memory page if the access rights within the TLB entry allow the memory page to be accessed by the currently executing process and if the protection key within the TLB entry can be found within the protection key registers 934 in association with an access mode that allows the currently executing process access to the memory page. The access rights contained within a TLB entry include a 3-bit access mode field that indicates one, of a combination of, read, write, and execute privileges, and a 2-bit privilege level field that specifies the privilege level needed by an accessing process. Each protection key register contains a 24-bit protection key associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware attempts to locate the correct TLB entry from an architected mapping control table, called the VHPT, located in kernel memory. If the hardware is unable to locate the correct TLB entry from the mapping control table, a TLB fault occurs and a kernel or operating system routine is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the process does not find a valid protection key within the protection key registers 934, or if the attempted access by the currently executing process is not compatible with the access mode in the TLB entry or the read/write/execute bits within the protection key in the protection key register, or the privilege level at which the currently executing process executes is less than the privilege level needed by the TLB entry, then a fault occurs that is handled by a kernel routine that dispatches execution to an operating system routine.

Figure 10:
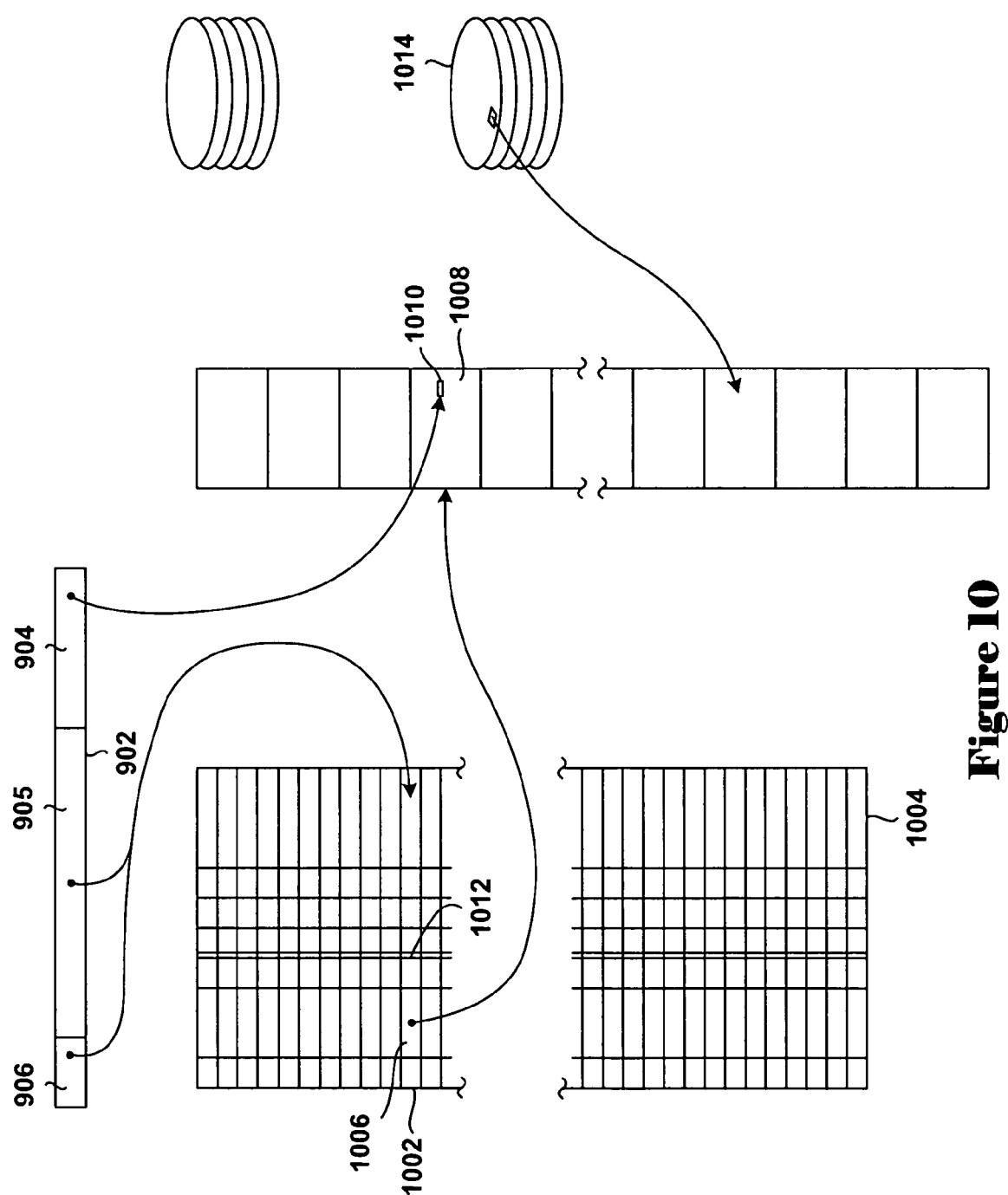
FIG. 10 shows the data structures employed by an operating system routine to find a memory page in physical memory corresponding to a virtual memory address.

FIG. 10 shows one form of a data structure employed by an operating system routine to find a memory page in physical memory corresponding to a virtual memory address. The virtual memory address 902 is shown in FIG. 10 with the same fields and numerical labels as in FIG. 9. The operating system routine employs the region selector field 906 and the virtual page address 905 to select an entry 1002 within a virtual page table 1004. The virtual page table entry 1002 includes a physical page address 1006 that references a page 1008 in physical memory. The offset 904 of the virtual memory address is used to select the appropriate byte location 1010 in the virtual memory page 1008. The virtual page table 1002 includes a bit field 1012 indicating whether or not the physical address is valid. If the physical address is not valid, then the operating system selects a memory page within physical memory to contain the memory page, and retrieves the contents of the memory page from an external storage device, such as a disk drive 1014. The virtual page table entry 1002 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

One possible architecture for a secure-platform system is described in the application "Secure Machine Platform that Interfaces to Operating Systems and Customized Control Programs," application Ser. No. 10/118,646, assigned to the Hewlett-Packard Company and filed on Apr. 8, 2002. The secure-platform system described in this application relies on various features of modern processors, such as the IA-64 processor architecture. However, secure-platform implementations may be provided on many different types of computer architectures using many different types of implementation strategies.

Figure 11:
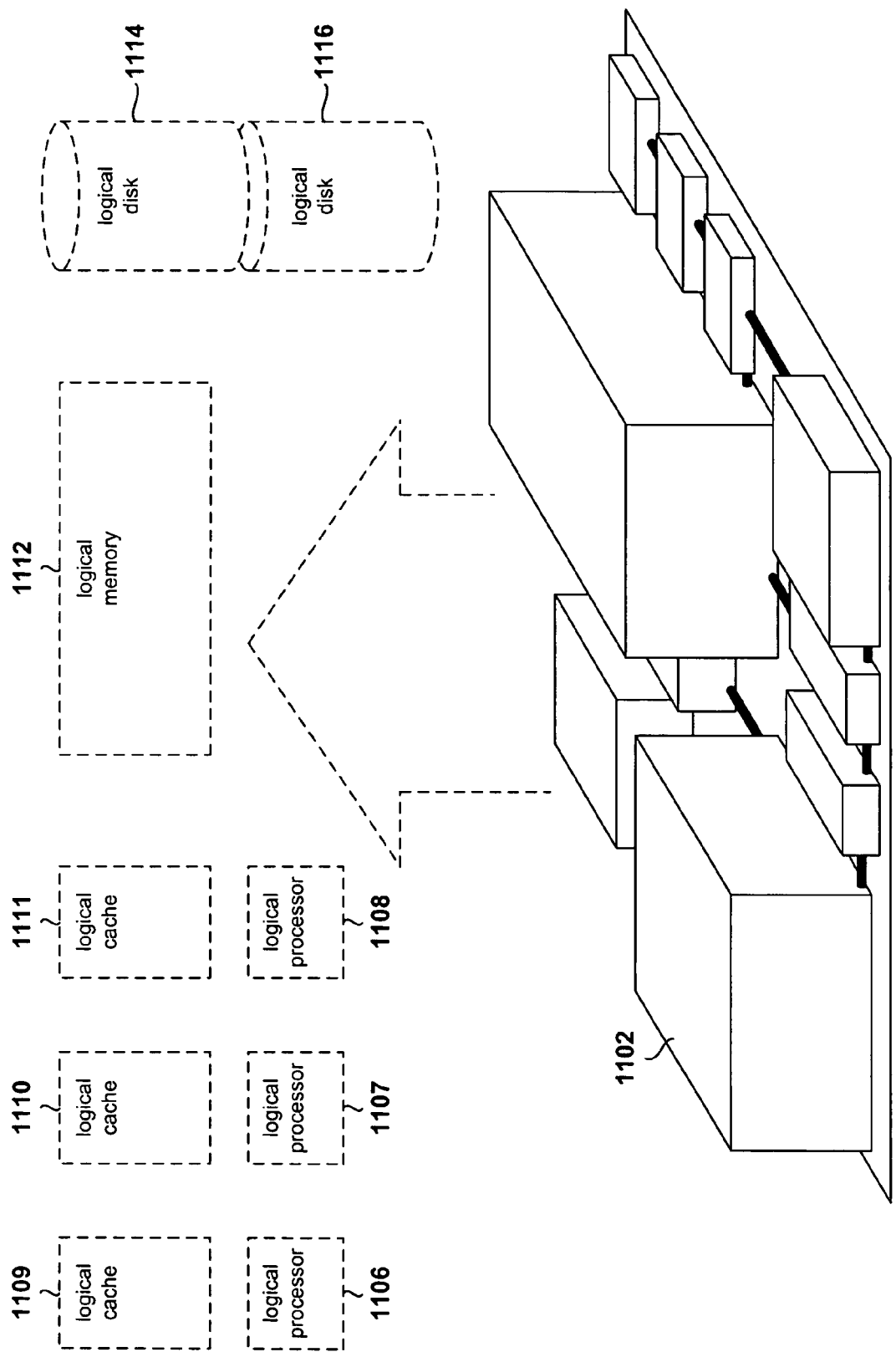
FIG. 11 illustrates concepts underlying certain embodiments of the present invention.

FIG. 11 illustrates concepts underlying certain embodiments of the present invention. In FIG. 11, a distributed system of individual single-processor and multi-processor computer systems, represented as rectangular boxes, such as rectangular box 1102 representing a multi-processor computer system, are shown interconnected by high-speed network interconnections, such as network interconnection 1104. In various embodiments of the present invention, the computing resources of all of the discrete, networked computer systems are mapped to a number of logical processors 1106–1108 associated with logical caches 1109–1111, respectively, a logical, distributed, global memory 1112, and one or more logical backing-store mass-storage devices 1114 and 1116. In other words, much as a traditional operating system running on a traditional computer system abstracts the individual physical components of the computer system to an abstract processing resource, including virtual memory, embodiments of the present invention abstract a networked collection of computer systems to a set of logical computer resources available to overlying operating systems and to processes and threads executing in environments provided by the overlying operating systems.

Figure 12:
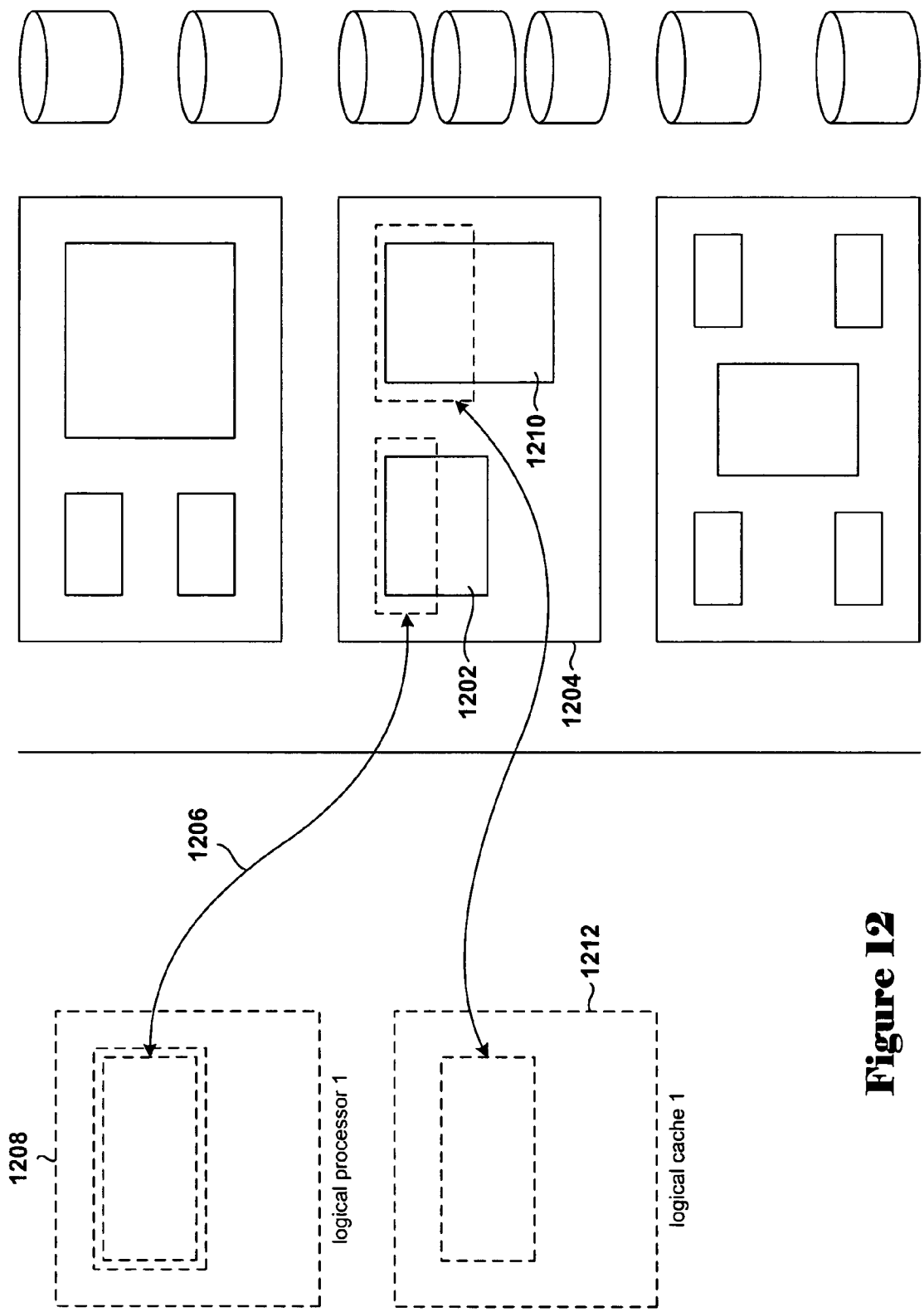
FIGS. 12–13 illustrate two different mappings of physical processor resources to a logical processor and associated logical cache that represent one embodiment of the present invention.
Figure 13:
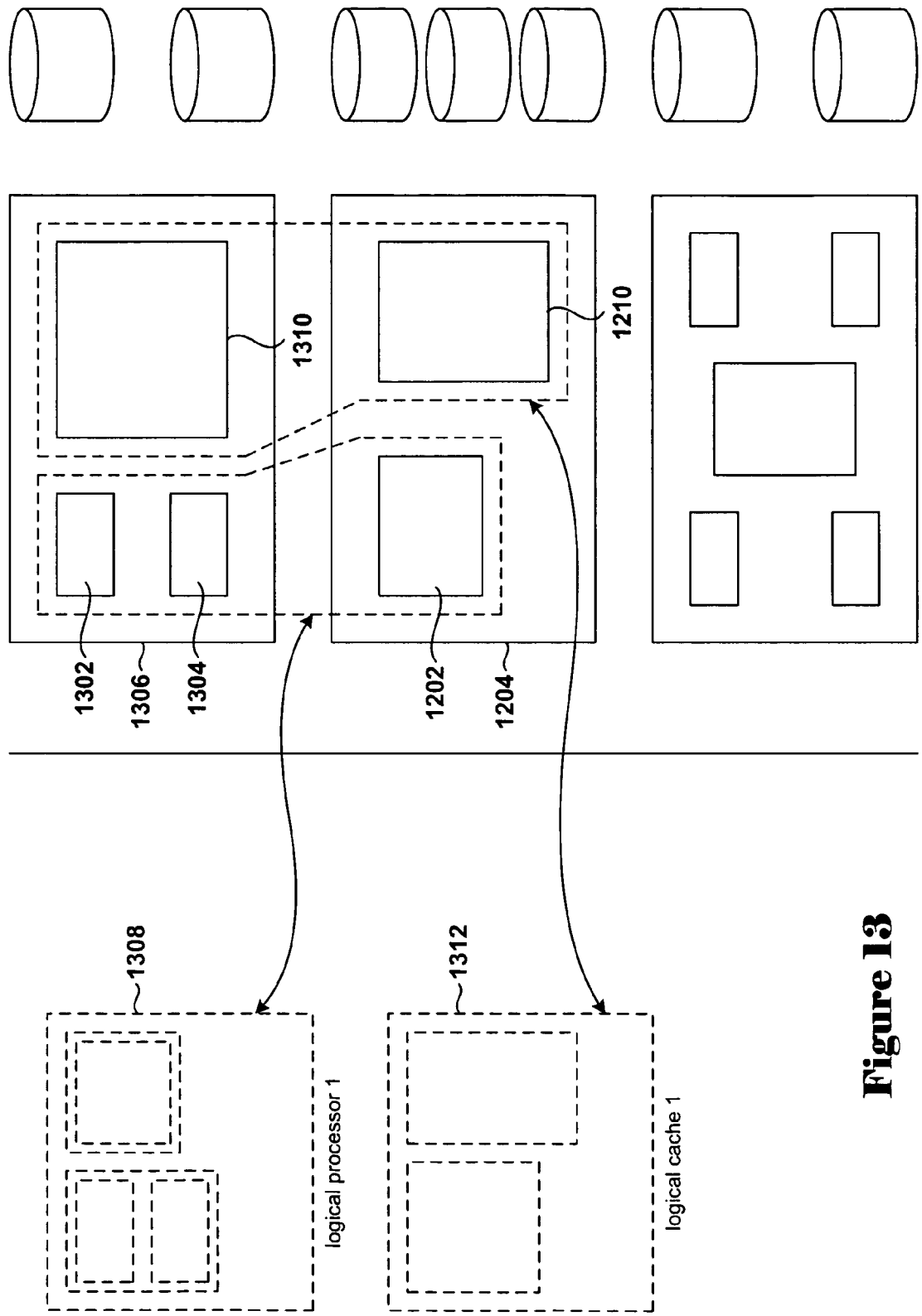

FIGS. 12–13 illustrate two different mappings of physical processor resources to a logical processor and associated logical cache that represent one embodiment of the present invention. In FIG. 12, some portion, in time, of the processing resource provided by a single processor 1202 within a single, discrete computer system 1204 is mapped 1206 to a logical processor 1208. A portion of the memory 1201 of the discrete computer system 1204 is mapped to a logical cache 1212 associated with the logical processor 1208. In FIG. 13, representing a different physical-to-logical mapping, the processing resource represented by two processors, 1302 and 1304 in one computer system 1306 and the single processor 1202 in another computer system 1204 are all mapped to a single logical processor 1308. The memories 1310 and 1210 of computer systems 1306 and 1204 are mapped to the logical cache 1312 associated with the logical processor 1308. The mappings may be statically defined, or may be dynamic, changing with changing demands and distributions of processing and memory needs within the distributed computing system.

Figure 14:
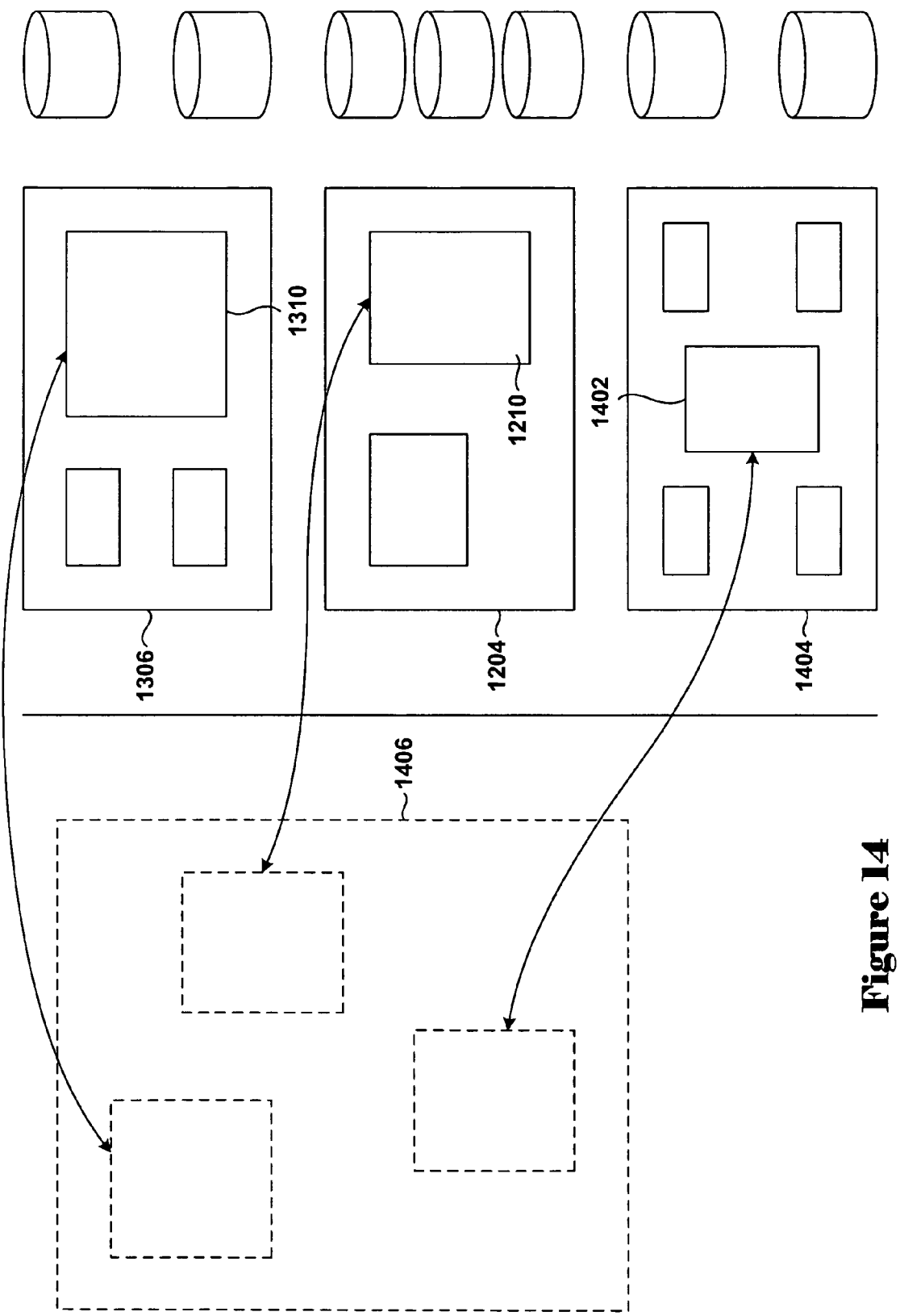
FIG. 14 illustrates a logical, distributed memory that represents one embodiment of the present invention.
Figure 15:
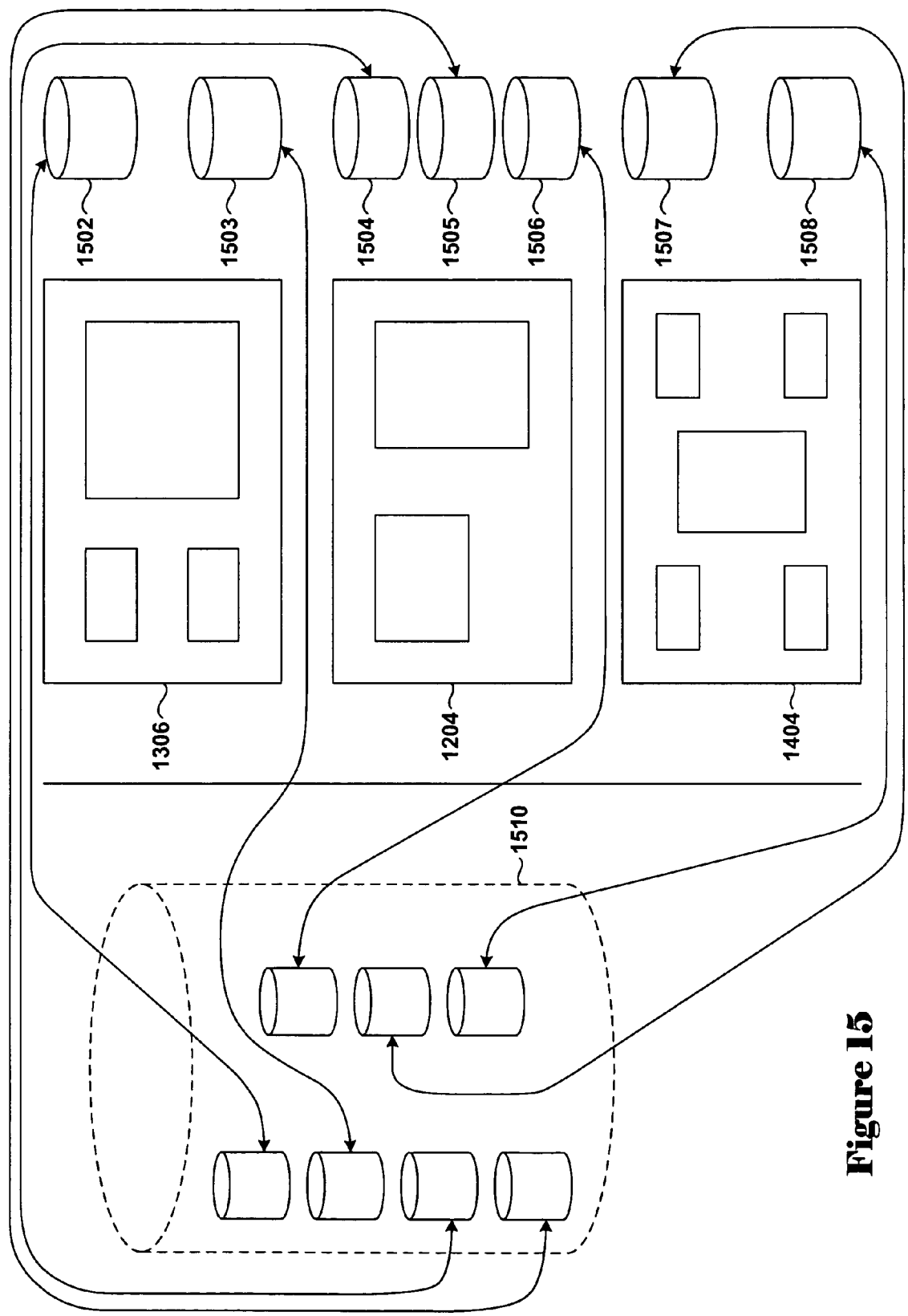
FIG. 15 illustrates a logical backing store that represents one embodiment of the present invention.

FIG. 14 illustrates a logical, distributed memory that represents one embodiment of the present invention. As shown in FIG. 14, all of the memory, including cache memory, of three discrete computer systems 1306, 1204, and 1404 is mapped to a single, logical, global memory 1406. In other words, the memories of the discrete computer systems are mapped to one or more logical caches, as shown in FIGS. 12 and 13, and the collection of all logical caches, and all corresponding physical memories, together compose a shared, distributed, global memory. FIG. 15 illustrates a logical backing store that represents one embodiment of the present invention. As shown in FIG. 15, all of the mass-storage devices 1502–1508 accessible to the discrete computer systems 1306, 1204, and 1404 are together considered to compose a logical, distributed mass-storage device 1510 that serves as backing store for the logical, distributed memory (1406 in FIG. 14).

Figure 16:
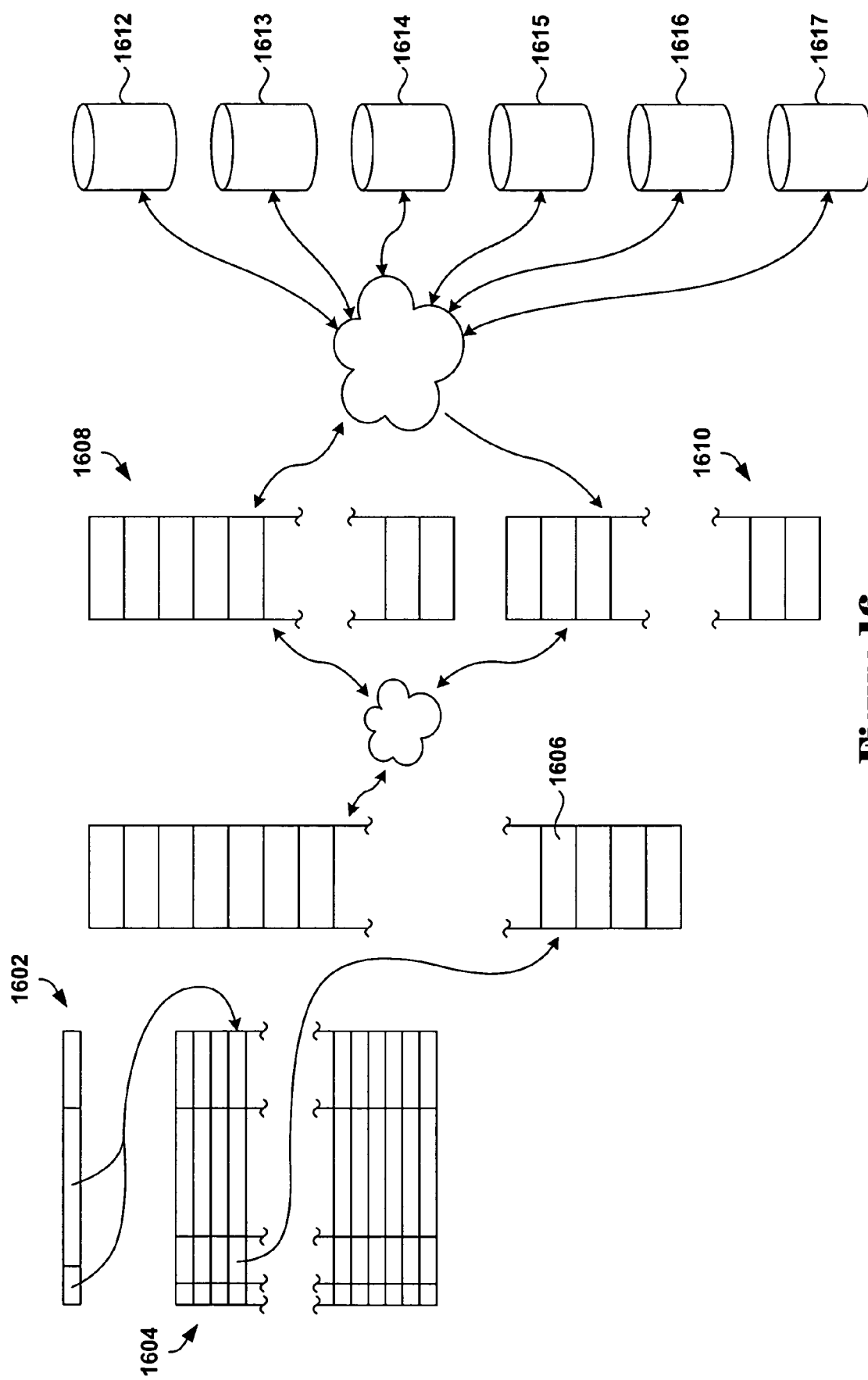
FIG. 16 shows an extension of the virtual-memory implementation illustrated in FIG. 10 for a distributed computing system, which represent one embodiment of the present invention, in which a secure platform provides a logical, distributed memory.

FIG. 16 shows an extension of the virtual-memory implementation illustrated in FIG. 10 for a distributed computing system, which represents one embodiment of the present invention, in which a secure platform provides a logical, distributed memory. As in the virtual-memory system shown in FIG. 10, a virtual-memory address 1602 is employed to access a TLB entry, and when a TLB entry is not found, to access a VHPT entry 1604 in order to locate a physical memory page 1606 in the physical memory local to a particular computer system corresponding to the virtual address. However, unlike in the non-distributed virtual-memory system shown in FIG. 10, a page described by a VHPT entry may not only be located in local memory 1606, but may also may be located in memories 1608 and 1610 of remote computer systems, accessed via high-speed network connections. If a local-physical-memory address for the page is not found in the VHPT, then the page may be found in a remote memory, and moved to local memory, with an update of the corresponding VHPT entry, via the network. If the page cannot be found in local memory or in remote memories, then the page may be found in one of more of the mass-storage devices 1612–1617, together composing the logical, distributed backing store, that are accessible via one or more network connections within the distributed computing system. Thus, the memory-mapping units and low-level memory-related firmware and hardware support originally designed for implementing virtual-memory within a single computer system may be similarly employed, with extensions facilitated by high-bandwidth networking, to support the distributed memory conceptually illustrated in FIG. 14. The extensions involve seeking memory pages in remote computer-system memories prior to seeking the memory pages in local and remote mass-storage-based backing store. Note also that the mechanisms for accessing remote memory, including network-communications access, are incorporated within the kernel routines responsible for handling TLB-associated and VHPT-associated faults. Various different techniques may be employed to designate a page as local or remote, including additional information stored in VHPT entries, additional mapping tables, or physical address ranges stored in memory that are mapped to remote memories.

A potential flaw with the distributed memory system described in FIGS. 11, 14, and 16 is that, when two threads running on processors in separate, discrete computer systems continuously contend for one or more common memory pages, thrashing may occur. The deleterious effects of threshing are magnified by the need to continually transport the one or more memory pages back and forth through the network, rather than merely through system busses in a single computer system. However, the logical-processor design schematically illustrated in FIG. 11 provides an easy fix for such thrashing problems. Rather than moving the memory page back and forth between networked computer systems, the threads that contend for a particular page may be co-located on a single machine, so that common access to a page by the threads is provided by intra-machine, physically-shared-memory access.

Although the present invention has been described in terms of a particular embodiment, it is not intended that the invention be limited to this embodiment. Modifications within the spirit of the invention will be apparent to those skilled in the art. For example, many different types of hardware-implemented, firmware-implemented, and software-implemented memory-management systems can be used to extend single-computer-system virtual memory implementations to logical, distributed memory implementations. Various types of scheduling, positioning, and replacement methods can be employed to provide a logical, distributed memory that is both computationally and time efficient, and that minimized bandwidth needs for transfer of memory pages on network interconnections between discrete computer systems. While logical, distributed memory is useful to facilitate inter-thread communication, logical, distributed memory is also useful for inter-process communication, for implementing operating-system service routines, and for many other purposes.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A distributed computing system comprising:
    a number of network-interconnected computer systems; and
    a logical, distributed-computing layer, implemented from components of the network-interconnected computer systems, that provides
    one or more logical processors;
    one or more logical caches associated with each logical processor;
    a logical, distributed memory; and
    a logical backing store.

2. The distributed computing system of claim 1 wherein the logical, distributed-computing layer is a secure-platform layer.

3. The distributed computing system of claim 1 wherein to a logical processor is mapped one or more of:
    a portion of a physical processor; and
    a physical processor.

4. The distributed computing system of claim 1 wherein to a logical cache is mapped one or more of:
    a physical cache;
    a portion of a physical memory; and
    a physical memory.

5. The distributed computing system of claim 1 wherein to the logical backing store is mapped one or more of:
    a portion of a mass storage device;
    a portion of a physical memory; and
    a physical memory.

6. The distributed computing system of claim 1 wherein threads executing on different physical processors can communicate using shared-memory techniques employing the logical, distributed memory.

7. The distributed computing system of claim 1 wherein intercommunicating execution threads may be collocated on a logical processor to which one or more processors local to a particular computer system are mapped in order to avoid network-communications overhead.

8. The distributed computing system of claim 1 wherein a local computer system translates a virtual address by:
    first accessing a local translation lookaside buffer;
    when an address translation is not found in the local translation lookaside buffer, accessing a local virtual page table;
    when the local virtual page table does not contain a local-physical-memory address for the page,
    accessing one or more remote memories to find the page;
    when the page is found in a remote memory,
    moving the page from the remote memory to local, physical memory through a network interconnection and updating the virtual page table; and
    when the page cannot be found in either local or remote memories,
    accessing the logical backing store to find the page and move the page from the logical backing store to local physical memory, updating the virtual page table.

9. A method for extending a virtual address translation system of a local computer system to implement a logical, distributed memory, the method comprising:
    when a valid virtual page table entry for a virtual page cannot be found, seeking a physical instantiation of the virtual page in one or more memories of remote computer systems;

when a physical instantiation of the virtual page is found in a memory of a remote computer system, moving the physical instantiation of the virtual page to local memory and updating the virtual page table; and when a physical instantiation of the virtual page is not found in a memory of a remote computer system, moving the physical instantiation of the virtual page to local memory and updating the virtual page table.

10. The method of claim 9 further including collocating intercommunicating threads within a physical computer system in order to prevent thrashing within the logical, distributed memory.

11. Computer instructions encoded in a computer-readable memory that implement the method of claim 9.

* * * * *